(12) United States Patent
Müller

(10) Patent No.: US 11,769,474 B2
(45) Date of Patent: Sep. 26, 2023

(54) FLUTE HEAD JOINT, METHOD OF PRODUCING A FLUTE HEAD JOINT AND FLUTE

(71) Applicant: Fliphead UG, Sundern (DE)

(72) Inventor: Axel Müller, Sundern (DE)

(73) Assignee: Fliphead UG, Sundern (DE)

( * ) Notice: Subject to any disclaimer, the term of this patent is extended or adjusted under 35 U.S.C. 154(b) by 0 days.

(21) Appl. No.: 17/690,822

(22) Filed: Mar. 9, 2022

(65) Prior Publication Data

US 2022/0301526 A1  Sep. 22, 2022

(30) Foreign Application Priority Data

Mar. 18, 2021  (DE) .......................... 102021106652.2

(51) Int. Cl.
| G10D 9/02 | (2020.01) |
| B33Y 80/00 | (2015.01) |
| G10D 9/08 | (2020.01) |
| G10D 7/026 | (2020.01) |
| B33Y 10/00 | (2015.01) |

(52) U.S. Cl.
CPC ................ *G10D 9/02* (2013.01); *B33Y 80/00* (2014.12); *G10D 7/026* (2013.01); *G10D 9/08* (2020.02); *B33Y 10/00* (2014.12)

(58) Field of Classification Search
CPC ............ G10D 3/04; G10D 1/085; G10D 3/00; G10D 1/00
See application file for complete search history.

(56) References Cited

U.S. PATENT DOCUMENTS

| 2,833,175 A | * | 5/1958 | Leblanc | ................. | G10D 7/066 |
| | | | | | 84/382 |
| 4,422,364 A | | 12/1983 | Volpa | | |
| 7,465,864 B2 | | 12/2008 | Heintz | | |
| 7,678,980 B2 | | 3/2010 | Rozier | | |
| 2012/0222539 A1 | | 9/2012 | Gandara | | |
| 2019/0180724 A1 | * | 6/2019 | Marius | ................... | G10D 7/026 |
| 2020/0265811 A1 | | 8/2020 | Silver | | |

FOREIGN PATENT DOCUMENTS

| CN | 206741919 U | 12/2017 |
| DE | 4242413 C1 | 11/1993 |
| FR | 3094827 A1 | 10/2020 |
| GB | 2040097 A | 8/1980 |
| WO | 2006027819 A1 | 3/2006 |
| WO | 2021035567 A1 | 3/2021 |

OTHER PUBLICATIONS

The Abell: "Low Whistle Headjoint" https://www.abellflute.com/, (Fotos siehe:https://flutecenter.com/pro ducts/abell-headjoint, 2022, 2 pages.

* cited by examiner

*Primary Examiner* — Kimberly R Lockett
(74) *Attorney, Agent, or Firm* — Slater Matsil, LLP

(57) ABSTRACT

In an embodiment a flute head joint includes a beak-shaped mouthpiece and a curved neck, wherein the mouthpiece comprises a curved labium, and wherein a chamber of the mouthpiece has a larger diameter than an inner cavity of the neck.

15 Claims, 5 Drawing Sheets

FLUTE HEAD JOINT, METHOD OF PRODUCING A FLUTE HEAD JOINT AND FLUTE

CROSS-REFERENCE TO RELATED APPLICATIONS

This application claims priority to Germany Application No. 102021106652.2, filed on Mar. 18, 2021, which application is hereby incorporated herein by reference.

BACKGROUND

Flutes have been known for a long time in a wide variety of designs. For example, there are recorders, transverse flutes, panpipes, etc. These types of flutes differ greatly in their blowing techniques. With the transverse flutes in particular it is often perceived as a challenge to learn and perfect the embouchure, which involves blowing onto a blowhole located in a blowing plate.

Due to the challenge described above, for musicians who mainly master other instruments and beginners, there are only limited possibilities to make music on a transverse flute.

SUMMARY

According to a first embodiment of the disclosure, a flute head joint for attachment to a transverse flute body comprises a beak-shaped mouthpiece and a curved neck. The mouthpiece further comprises a curved labium. A chamber of the mouthpiece further has a larger diameter than an interior of the neck.

One advantage of the flute head joint described here is that a beginner or musician, who mainly plays other instruments—for example other woodwind instruments such as saxophone, oboe, clarinet, etc.—can easily play on the body of a transverse flute without having to learn the complicated embouchure of the transverse flute or the unfamiliar transverse posture of the transverse flute.

The player takes the beak-shaped mouthpiece between the lips to blow into a windway located in the mouthpiece. This type of embouchure is relatively easy to learn and use.

The curved neck, which serves as a connecting piece between the mouthpiece and the transverse flute body and which forms an S-bow, allows the flute to be held easily and ergonomically in front of the body, for example centered in front of the chest. This makes it easier for a beginner or other musician to play on a transverse flute body, as there is no need to adopt a complicated transverse posture.

The transverse flute body is defined here as the part of a transverse flute which comprises, for example, a flute centerpiece or a flute centerpiece combined in one piece with a flute footpiece. The transverse flute body has in particular tone holes and possibly flaps for opening and closing the tone holes.

The labium is the part of the mouthpiece that divides the blown air and thus produces the sound. For this purpose, the labium has a blowing edge, also called a cutting edge, onto which the blown air hits, causing the blown air stream to vibrate, which produces the sound. The labium of the mouthpiece is curved here. The labium is curved around a longitudinal axis of the mouthpiece. This longitudinal axis is parallel to the direction of the blown air stream. The curved labium simplifies tone production, which further facilitates playing a flute with such a flute head joint, especially for beginners and other musicians. In this way, beginners and other musicians can also produce a full, pleasant sound with this flute head joint.

The chamber of the mouthpiece is a cavity inside the mouthpiece in which no other elements are arranged, not even the neck when it is inserted into the mouthpiece. The chamber extends between side walls of the mouthpiece, from the beak to the area where the neck is inserted. A diameter of this chamber perpendicular to the longitudinal axis is larger than a diameter of a corresponding inner cavity of the neck perpendicular to the air flow. This relatively large inner space of the mouthpiece also simplifies tone production and provides a large resonance space in the mouthpiece, so that beginners and other musicians can produce a full, pleasant sound without much practice.

Both the large chamber of the mouthpiece and the curved labium further contribute to a special sound produced by this flute head joint, which differs from both the sound of a conventional transverse flute and the sound of a conventional recorder.

According to at least one embodiment, the mouthpiece further comprises a window, wherein the window has a length in the injection direction of at least half of a length of the chamber of the mouthpiece.

The window is a recess in a side wall of the flute head joint through which a portion of the injected air exits. On one side, the window is bounded by the labium. The size of the window disclosed herein is larger than of other wind instruments having such windows, for example recorders, and thus additionally improves tone production, further facilitating the embouchure of the flute, especially for beginners and other musicians. With a relatively large window as described here, it is also possible for such players to produce a pleasant, soft sound without much practice. Furthermore, the relatively large window also supports the above-mentioned special sound of this flute head joint.

According to at least one embodiment, the mouthpiece and the neck are rotatably connected to each other.

An advantage of this is that it allows a flexible playing posture. The instrument, which is ergonomically held in front of the body, can be adjusted by turning the mouthpiece relative to the neck in such a way that the instrument can also be played laterally offset from a central axis of the body. For example, tenor and bass saxophones or bassoons are played this way, making it easier for such musicians in particular to play a flute with the flute head joint shown here, but also making it easier for other musicians and beginners to play due to the possibility of an individual ergonomic adjustment.

In at least one embodiment, the mouthpiece is formed as one piece.

An advantage here is that a simpler and less expensive production of the flute head joint is made possible. It also reduces the possible wear that can occur with multi-piece mouthpieces, for example with those having a block in the flute head.

According to at least one embodiment, the mouthpiece further comprises a curved windway.

The windway directs the injected airflow from the player's lips, which abut the beak of the mouthpiece, to the chamber or window of the mouthpiece. The windway is also curved around the longitudinal axis of the mouthpiece. For example, the curve of the windway has the same radius as the curve of the labium. An advantage of the curved windway is that the tone production in this flute head joint is further improved, which further facilitates playing a flute with such a flute head joint, especially for beginners and other musicians. Since the shape of the windway has an influence on the air flow and air volume in the mouthpiece, this additionally supports the above-mentioned special sound of this flute head joint.

According to at least one embodiment, a first edge located at a rear end of the windway in the injection direction and facing an outer side of the mouthpiece is offset in the direction of an injection opening with respect to a second edge located at the rear end of the windway in the injection direction and facing the chamber and/or the second edge located at the rear end of the windway in the injection direction and facing the chamber is beveled.

An advantage of this is that the amount of air that is injected into the chamber of the mouthpiece, or the amount of air that exits through the window, is regulated, which further improves the tone production and thus allows a beginner or inexperienced player to play the instrument without much practice. This also affects the sound and contributes to the special sound of this flute head joint.

According to at least one embodiment, the mouthpiece has a stop against which the neck abuts, the stop having a streamlined edge facing the chamber of the mouthpiece and/or the stop being recessed in a region located behind the labium in the injection direction.

The stop represents a boundary of the hollow interior of the mouthpiece relative to the part of the mouthpiece into which the neck is inserted. The stop prevents the neck from being inserted too far into the mouthpiece, which enables consistent intonation and tuning of a flute with such a flute head joint, since insertion of different depths would change the tuning of the flute. Streamlined in this context means that said edge of the stop is rounded or beveled. Both the streamlined shape and the recess reduce or minimize turbulences of the airflow inside the flute head joint.

According to at least one embodiment, the mouthpiece is provided with a biocompatible varnish. Alternatively or additionally, the mouthpiece may be made of or at least comprise nylon polyamide, also known as PA12. PA 12 is a biocompatible material and, hence, does not require a biocompatible varnish.

An advantage here is that a material can be used for the mouthpiece, the mouthpiece being put in the mouth by the player when playing, that is non-biocompatible. In this sense, biocompatible means that the varnish or material generally does not have a significant negative effect on the player, even when the varnish or material comes into contact with mucous membranes.

According to a second embodiment of the disclosure, a method of manufacturing a flute head joint comprises the following steps:
  manufacturing, by a 3D printing process, a beak-shaped mouthpiece, the mouthpiece having a curved labium,
  connecting the mouthpiece to a curved neck, wherein a chamber of the mouthpiece has a larger diameter than an interior of the neck.

This enables the mouthpiece to be manufactured quickly and without effort. In particular, for one-piece mouthpieces, a 3D printing method for manufacturing is advantageous, since in this way the large chamber of the mouthpiece can be created without having to assemble different parts.

According to a third embodiment of the disclosure, a flute comprises a transverse flute body and a flute head joint according to the first embodiment, wherein the flute head joint is attached to the transverse flute body.

Embodiments and advantages of the second and third embodiments are substantially the same as those of the first embodiment. Embodiments disclosed with respect to the first embodiment may, accordingly, also be used for the second and/or third embodiment.

BRIEF DESCRIPTION OF THE DRAWINGS

Embodiments of the disclosure are disclosed in the appended claims, as well as the figures and description thereof.

DETAILED DESCRIPTION OF ILLUSTRATIVE EMBODIMENTS

Figure 1:
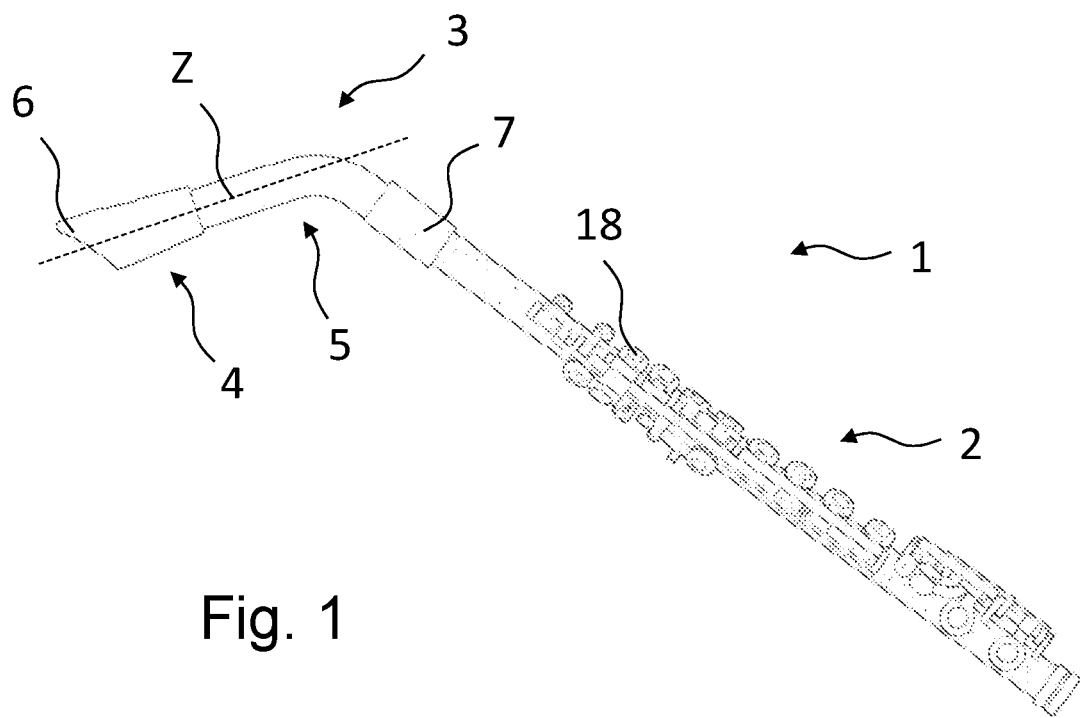
FIG. 1 shows a schematic perspective view of a flute according to an embodiment of the disclosure.

FIG. 1 shows a schematic perspective view of a flute 1 according to an embodiment of the disclosure. The flute 1 comprises a transverse flute body 2 and a flute head joint 3. The flute head joint 3 comprises a mouthpiece 4 and a curved neck 5. The mouthpiece 4 has a beak 6, which a user takes between the lips to play the flute 1. Such a beak shape and consequently a corresponding blowing technique can be found, for example, in recorders. The neck 5 has a non-conical shape. The transverse flute body 2 has a plurality of flaps 19 which are actuated by a player of the flute 1 to produce different tones. However, the transverse flute body 2 can, of course, also be designed differently.

The mouthpiece 4 is in one piece and made, for example, of synthetic resin. The mouthpiece 4 may further be provided with a biocompatible varnish. Alternatively or additionally, the mouthpiece may be made of or at least comprise nylon polyamide, also known as PA12. PA 12 is a biocompatible material and, hence, does not require a biocompatible varnish. The neck 5 is made, for example, of a copper-nickel-zinc alloy, for example nickel silver, or of a cast copper-nickel alloy, and may be polished and/or silver-plated to reduce or prevent tarnishing.

The mouthpiece 4 is put onto the neck 5 and consequently has a larger outer diameter than the neck 5, as described in detail with reference to FIGS. 5 and 6. The mouthpiece 4 is preferably connected to the neck 5, rotatably about a central axis Z lying parallel to an air injection direction. In this way, the mouthpiece 4 can be rotated relative to the neck 5, which allows different playing positions of the flute 1. Alternatively, however, the mouthpiece 4 can also be firmly connected to the neck 5, for example by means of an adhesive. Furthermore, the mouthpiece 4 and neck 5 can also be designed as a single piece.

The neck 5 is inserted into the transverse flute body 2, so that the transverse flute body 2 has a larger outer diameter than the neck 5 at an end facing the flute head joint 3. The transverse flute body 2 has a connecting piece 7 for inserting the neck 5 for this purpose. One end of the neck 5 facing the transverse flute body 2 here has a shape and size corresponding to a conventional transverse flute head, so that the flute head joint 3 can be plugged onto any conventional transverse flute body 2 without having to make any changes to the transverse flute body 2. For this purpose, the neck 5 can be designed in particular at the end facing the transverse flute body 2 in such a way that the outer diameter of the neck 5 in this region can be adapted to an inner diameter of the transverse flute body 2.

Figure 2:
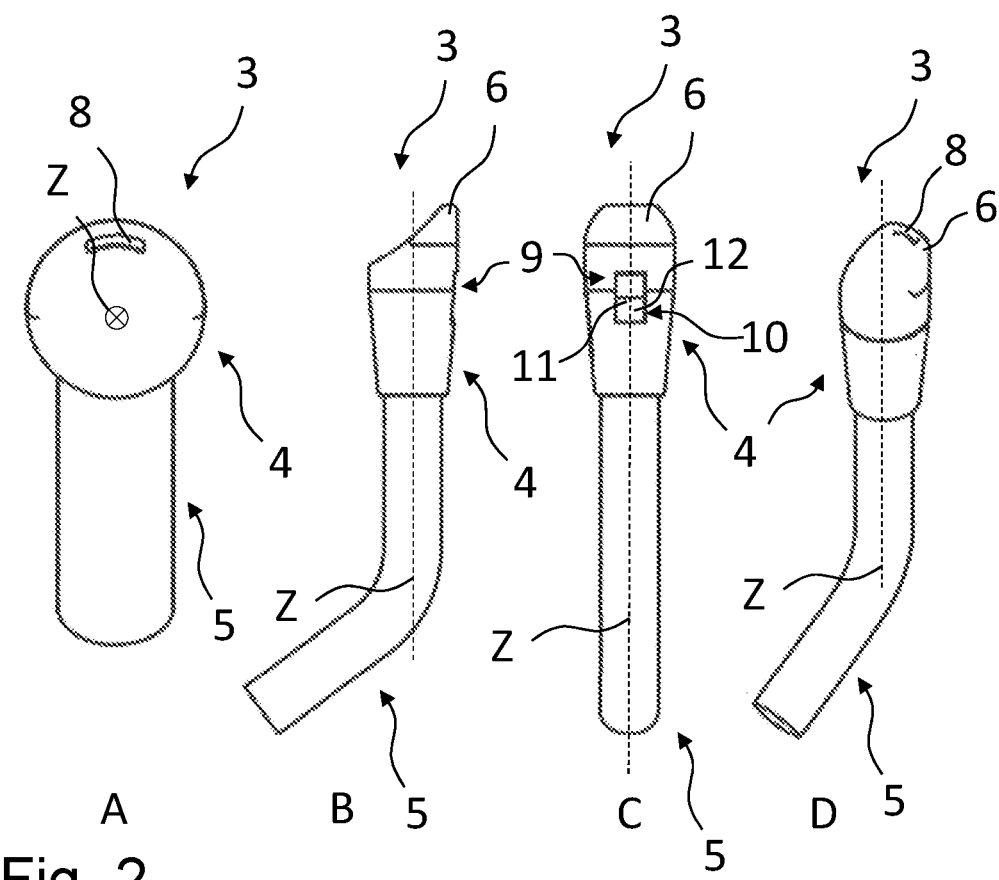
FIG. 2 shows various schematic views of a flute head joint according to an embodiment of the disclosure.
Figure 3:
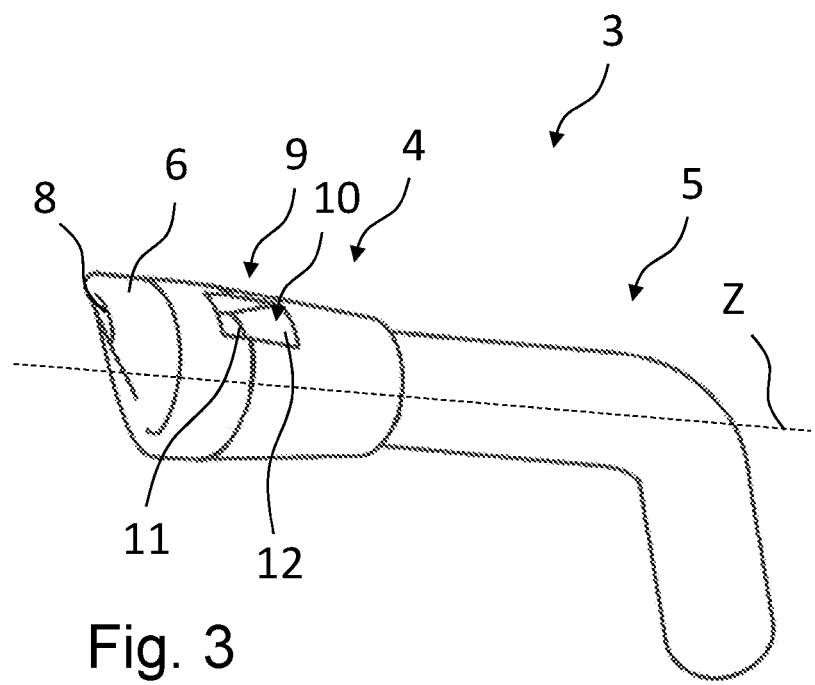
FIG. 3 shows a schematic perspective view of the flute head joint according to the embodiment of FIG. 2.

Various schematic views of the flute head joint 3 of the flute 1 according to the embodiment of FIG. 1 are further shown in FIGS. 2 and 3. FIG. 2 shows, in illustration A, a schematic view of the flute head joint with a view in the direction of the air injection, along the central axis Z shown in FIG. 1. In this illustration, a windway 8 can be seen, which is located in the mouthpiece 4. A player blows air into the windway 8 when playing the flute 1 to produce a sound.

The windway 8 is curved in the embodiment example shown here. The windway 8 is curved around the central axis Z, wherein the curve of the windway 8 is formed such that the curve of the windway 8 is parallel to a circumference of the mouthpiece 4. In other words, the curve of the windway 8 extends along a circular arc around the central axis Z. Alternatively, however, a curve of the windway 8 could have a sharper or less sharp bend than shown herein.

In the illustrations B and C, a window 9 of the mouthpiece 4 can further be seen. The window 9 is a recess in a side wall of the mouthpiece 4, through which a portion of the air blown into the windway 8 exits. On one side, the window 9 is bounded by a labium 10, which can be seen in the illustration C of FIG. 2. The labium 10 is the part of the mouthpiece 4 that divides the blown air to produce the sound. For this purpose, the labium 10 has a blowing edge 11, also called a cutting edge, which is met by the injected air, causing the injected air stream to vibrate, which produces the sound.

FIG. 3 shows the flute head joint 3 with the elements described with respect to FIGS. 1 and 2 in a schematic perspective view. In this view, it can be seen that a labium surface 12 of the labium 10 is arranged at an angle with respect to the side wall of the flute head joint 3. The end of the labium surface 12 at which the blowing edge 11 is located is inward looking.

Furthermore, it can be seen in FIG. 3 that the labium 10 is curved, i.e. the labium surface 12 shown here is convex. Like the windway 8, the labium 10 is curved about the central axis Z, the bend of the labium 10 being such that the bend is also parallel to a circumference of the mouthpiece 4. In other words, the bend of the labium 10 is also along a circular arc about the central axis Z. Alternatively, however, the curve of the labium 10 may have a stronger or weaker bend than shown herein. Preferably, the bend of the labium 10 and the bend of the windway 8 are substantially the same. This curve of the labium can also be seen in FIG. 4.

Figure 4:
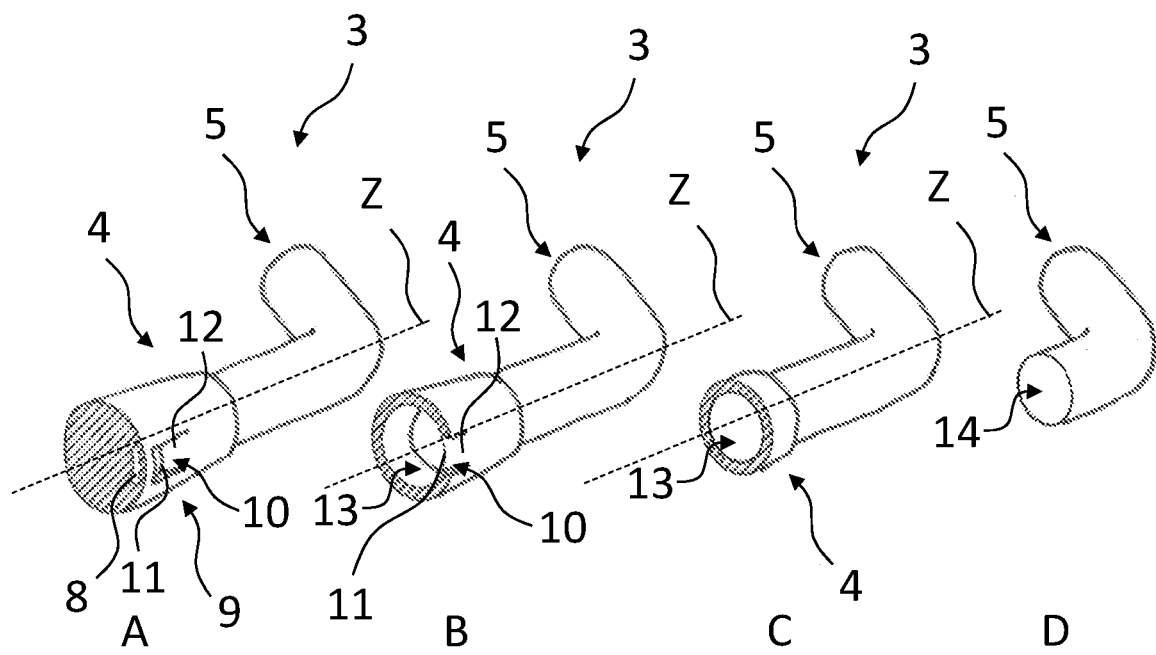
FIG. 4 shows various schematic cross-sections of the flute head joint according to the embodiment of FIGS. 2 and 3.

FIG. 4 shows four different schematic cross-sections A to D of the flute head joint 3 according to the previously described embodiment. The illustration D of FIG. 4 shows a cross-section through the neck 5. The illustrations A to C show different cross-sections through the mouthpiece 4.

The cross-section A shows a sectional plane located in the direction of air injection in front of the window 9 and shows the curved windway 8 in the sectional plane. The cross-section B shows a sectional plane located at the level of the blowing edge 11 of the labium 10. The cross-section C shows a sectional plane located behind the window 9 in the air injection direction. In the illustrations B and C, chamber 13 of the mouthpiece 4 can be seen, which represents a cavity inside the mouthpiece 4. In the illustration D, a cavity 14 of the neck can be seen. The chamber 13 of the mouthpiece 4 is a cavity which is free from other components, e.g. free from the neck 5. Both cavities 13, 14 are described in more detail with reference to FIGS. 5 and 6.

Figure 5:
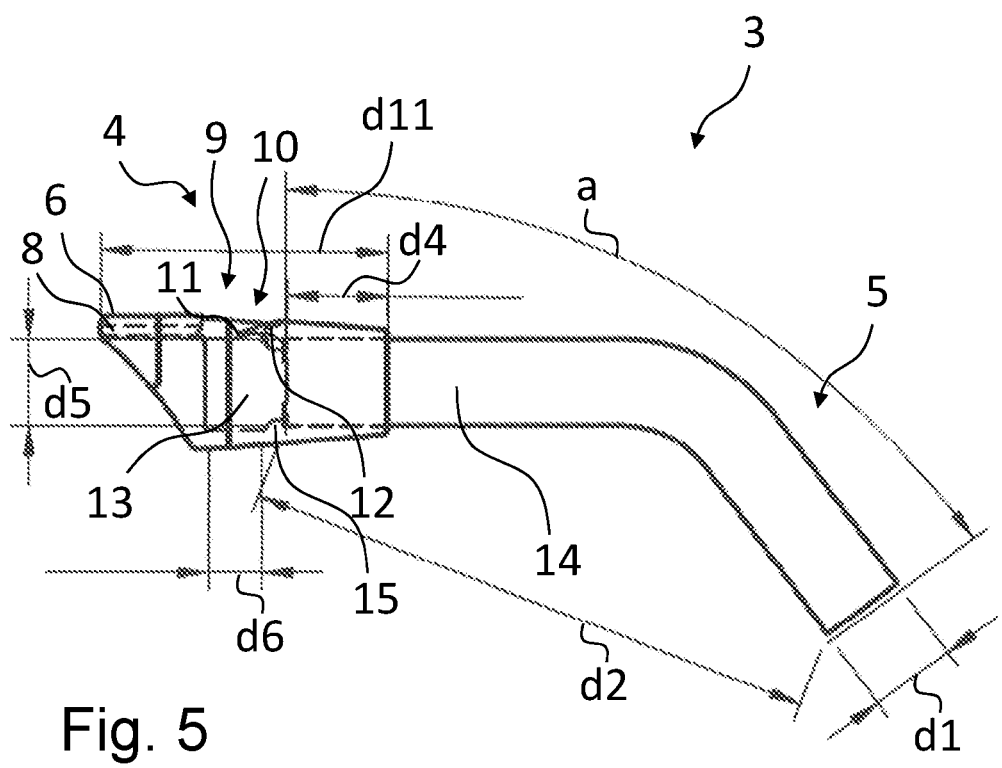
FIG. 5 shows a schematic longitudinal sectional view of the flute head joint according to the embodiment of FIGS. 2, 3 and 4.
Figure 6:
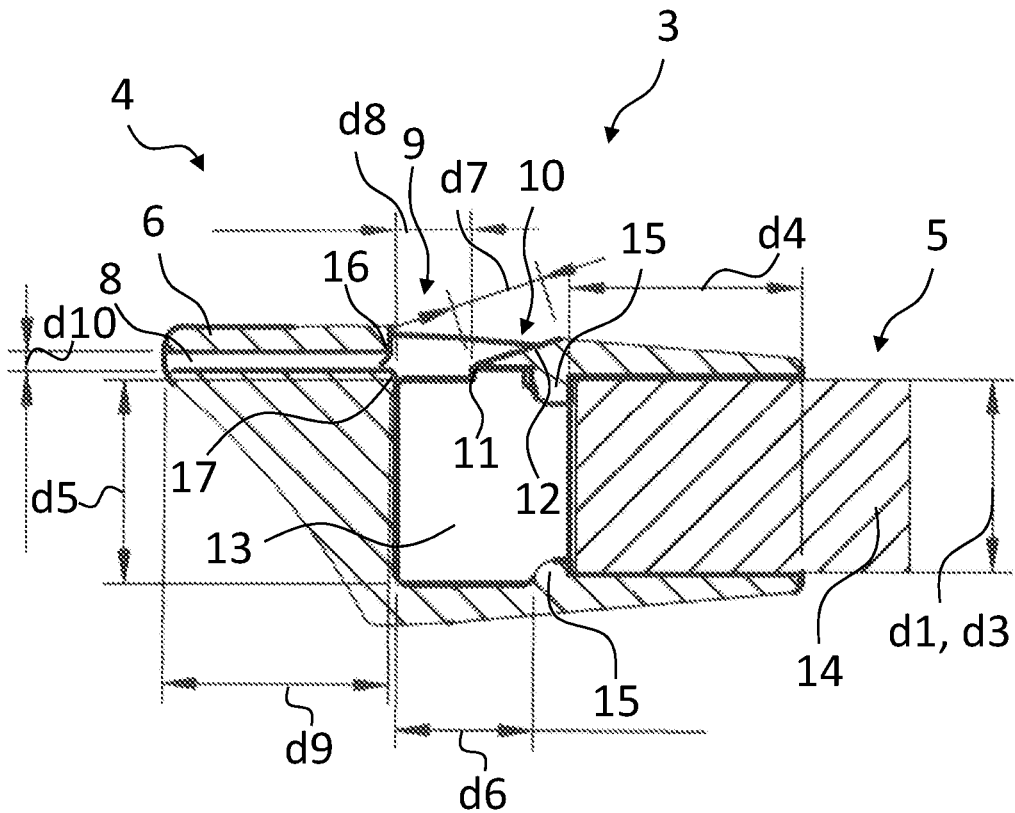
FIG. 6 shows a schematic longitudinal sectional view of a mouthpiece according to an embodiment of the disclosure.

FIGS. 5 and 6 show schematic longitudinal sections of the flute head joint 3, FIG. 6 in particular of the mouthpiece 4, according to the previously described embodiment. With respect to the illustrations in FIGS. 5 and 6, exemplary dimensions for parts of the flute head piece are provided. However, the dimensions may be chosen differently within suitable limits.

FIG. 5 shows the entire flute head joint 3 comprising the mouthpiece 4 and the neck 5. The neck 5 here has a curve of 54° and an outer diameter d1 of 20 mm. In the embodiment shown here, the neck 5 has, in the curved state, a length d2 of 134.17 mm between the ends of the neck 5 that are located on the inside with respect to the curve. The neck 5 is also thin-walled, i.e. it has, for example, a wall thickness of at least 2 mm to at most 5 mm.

The neck 5 can be bent with suitable tools, so that, for example, a straight tube can be used, which is brought into the curved shape of the neck 5 by means of bending. In addition, a circumference of the neck 5 can be changed at an end of the neck 5 facing away from the mouthpiece 4. In this way, the outer diameter d1 of 20 mm can be precisely adapted to a connecting piece of a transverse flute body into which the neck 5 is to be inserted.

The mouthpiece 4, which is shown in FIG. 5 and FIG. 6, has an inner diameter d3 of 20 mm in an insertion area for the neck 5. This corresponds to the outer diameter d1 of the neck 5, so that the neck 5 is inserted into the mouthpiece 4 with an exact fit.

In order to limit the depth of insertion of the neck 5 into the mouthpiece 4 and to fix the neck 5 in the mouthpiece 4 in the direction of insertion, the mouthpiece 4 has a stop 15 on the inside. The stop 15 has a surface facing the neck 5, against which the neck 5 rests in the inserted state and which limits the insertion depth. On a side facing away from the neck 5, i.e. a side facing the chamber 13 of the mouthpiece 4, the stop 15 has a rounded edge. This streamlined shape improves an air flow inside the mouthpiece. In this embodiment example, the neck 5 is inserted into the mouthpiece 4 to a depth d4 of 24 mm. The stop 15 separates the chamber 13 of the mouthpiece 4 from the insertion area.

The hollow chamber 13 of the mouthpiece 4 has a diameter d5 perpendicular to the center axis Z, which is larger than a corresponding diameter of the cavity 14 of the neck 5. The diameter d5 is 21.22 mm in this embodiment. A length d6 of the chamber 13, parallel to the central axis Z, is 13 mm in this embodiment.

In addition, FIGS. 5 and 6 show the labium 10 described earlier. In the embodiment shown here, the labium surface 12 has a length d7 of 9.73 mm. The window 9 here has a length d8 of 7.7 mm in the injection direction. The length d8 of the window 9 is thus more than half the length d6 of the chamber 13 of the mouthpiece 4. A width of the window 9 lying in the viewing direction of the sectional view is, for example, 10 mm. A ratio between the length d8 of the window 9 and the width of the window 9 is thus specifically 77%. In general, this ratio can preferably be in a range of 70% to 85%. Through this, the dimensions of the window 9 of the mouthpiece 4 differ significantly from the dimensions of a window of an ordinary recorder, in which a corresponding window has a larger width but smaller length. This influences the special sound of the mouthpiece 4.

In the embodiment shown here, the windway 8 has a length d9 of 23.44 mm and a width d10 of 1.97 mm. A first edge 16 located at a rear end of the windway 8 in the injection direction and facing an outer side of the mouthpiece 4 is offset in the direction of the beak 6 with respect to a second edge 17 located at the rear end of the windway 8 in the injection direction and facing the chamber 13. Furthermore, the second edge 17 located at the downstream end of the windway 8 facing the chamber 13 in the direction of injection may be beveled. A length d11 of the entire mouthpiece in this embodiment example is 66.25 mm.

Figure 7:
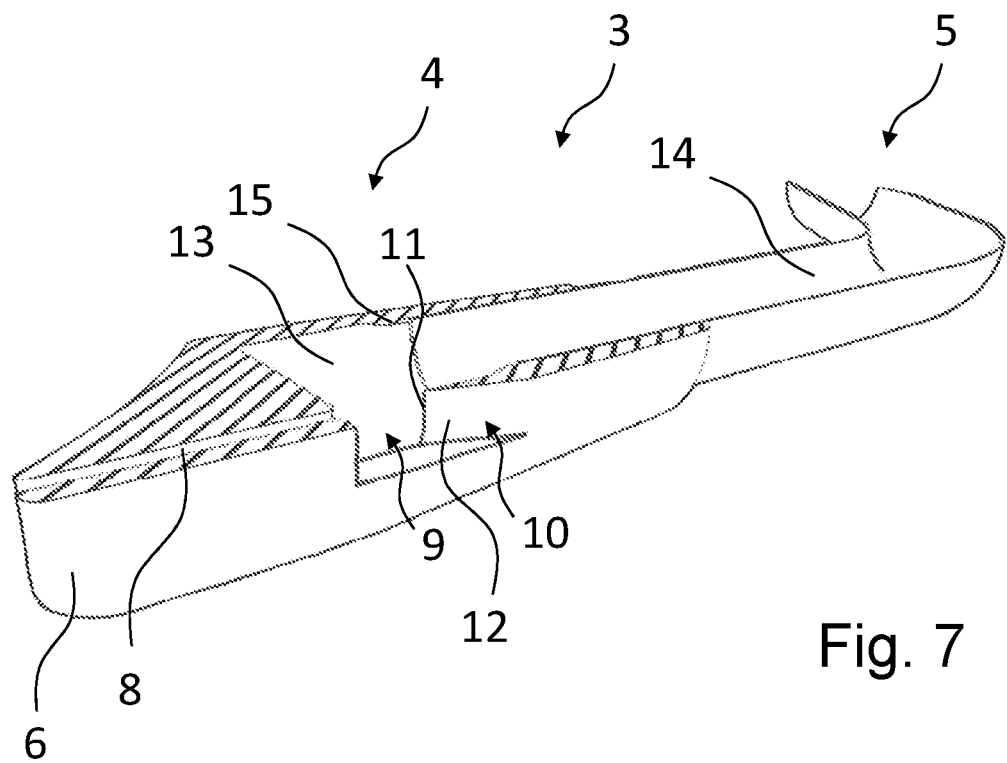
FIG. 7 shows a schematic, perspective front view of a longitudinal sectional view of the flute head joint according to the embodiment of FIGS. 2, 3, 4 and 5.
Figure 8:
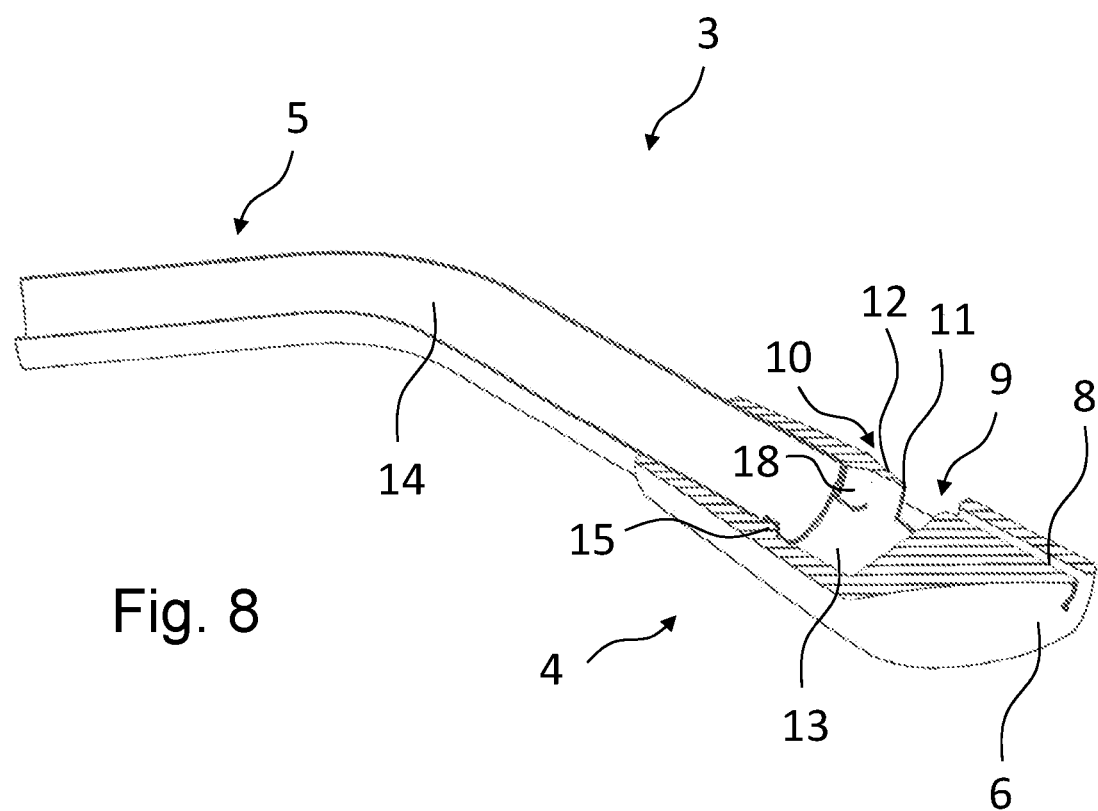
FIG. 8 shows a schematic, perspective rear view of a longitudinal sectional view of the flute head joint according to the embodiment FIGS. 2, 3, 4, 5 and 7.

FIGS. 7 and 8 show longitudinal sections of the flute head joint 3 according to the previously described embodiment in a perspective view. Another advantageous feature, which can be seen in FIG. 8, is a recess 18 in the stop 15. This recess 18 is located in an area in the injection direction behind the window 9. At this location, the stop 15 is recessed, which has less interference with the air flow inside the flute head joint 3.

Figure 9:
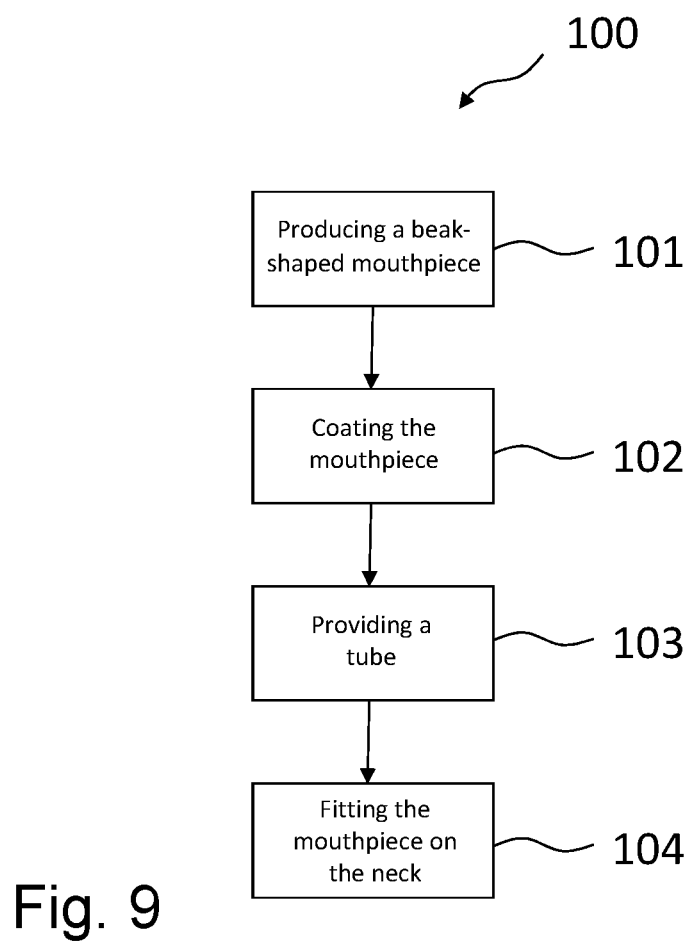
FIG. 9 shows a flow diagram of a process for manufacturing a flute head joint according to an embodiment of the disclosure.

FIG. 9 shows a flow diagram of a method wo for manufacturing a flute head joint according to an embodiment of the disclosure. For example, the flute head joint 3 described above is manufactured by means of this process.

In a first step 101, a beak-shaped mouthpiece having a curved labium is produced by means of a 3D printing process. The mouthpiece is fabricated in one piece using the 3D printing process. For example, a so-called "digital light processing" (DLP) is used to manufacture the mouthpiece. In this process, the mouthpiece is produced from a synthetic resin by means of 3D printing. Alternatively, a so-called "selective laser sintering" (SLS) processing is used as the 3D printing process. In this process, the mouthpiece may be made of or at least comprise nylon polyamide, also known as PA12. Such processes are particularly advantageous because high resolutions are achieved here, which provides particularly good results when manufacturing the labium.

In a second step 102, the mouthpiece is coated with a biocompatible varnish. Alternatively or additionally, the mouthpiece may be made of or at least comprise nylon polyamide, also known as PA12. PA 12 is a biocompatible material and, hence, does not require a biocompatible varnish. Biocompatible in this sense means that the varnish or material generally has no significant negative effect on the player, even when the varnish or material comes into contact with mucous membranes.

In a third step 103, a tube is provided. The tube may already be pre-bent so that it can immediately serve as a curved neck. Alternatively, the tube is formed into the curved neck by bending.

In a fourth step 104, the mouthpiece is fitted onto the neck, wherein a chamber of the mouthpiece has a larger diameter than a cavity of the neck.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A flute head joint comprising:
a beak-shaped mouthpiece; and
a curved neck,
wherein the mouthpiece comprises a curved labium,
wherein the labium is curved around a longitudinal axis of the mouthpiece, and the longitudinal axis is parallel to a direction of a blown air stream,
wherein a chamber of the mouthpiece has a larger diameter than an inner cavity of the neck, and
wherein the flute head is configured for attachment to a transverse flute body.

2. The flute head joint according to claim 1, wherein the mouthpiece further comprises a window, and wherein the window has a length in an air injection direction of at least half of a length of the chamber of the mouthpiece.

3. The flute head joint according to claim 1, wherein the mouthpiece and the neck are rotatably connected to each other.

4. The flute head joint according to claim 1, wherein the mouthpiece is formed in one piece.

5. The flute head joint according to claim 1, wherein the mouthpiece further comprises a curved windway.

6. The flute head joint according to claim 5, wherein a first edge, located at a rear end of the windway in an injection direction and facing an outer side of the mouthpiece, is offset in a direction of an injection opening with respect to a second edge located at the rear end of the windway in the injection direction and facing the chamber and/or the second edge, located at the rear end of the windway in the injection direction and facing the chamber, is beveled.

7. The flute head joint according to claim 1, wherein the mouthpiece has a stop against which the neck abuts, and wherein the stop has a streamlined edge facing the chamber of the mouthpiece and/or the stop is recessed in a region located behind the labium in an injection direction.

8. A flute comprising:
the transverse flute body and the flute head joint according to claim 1,
wherein the flute head joint is attached onto the transverse flute body.

9. A method of manufacturing a flute head joint, the method comprising:
manufacturing, with a 3D printing process, a beak-shaped mouthpiece, the mouthpiece having a curved labium, wherein the labium is curved around a longitudinal axis of the mouthpiece, and the longitudinal axis is parallel to a direction of a blown air stream; and
connecting the mouthpiece to a curved neck, wherein a chamber of the mouthpiece has a larger diameter than an inner cavity of the neck.

10. A flute head joint comprising:
a beak-shaped mouthpiece; and
a curved neck,
wherein the mouthpiece comprises a curved labium,
wherein a chamber of the mouthpiece has a larger diameter than an inner cavity of the neck,
wherein the flute head is configured for attachment to a transverse flute body,
wherein the mouthpiece further comprises a window, and
wherein the window has a length in an air injection direction of at least half of a length of the chamber of the mouthpiece.

11. The flute head joint according to claim 10, wherein the mouthpiece and the neck are rotatably connected to each other.

12. The flute head joint according to claim 10, wherein the mouthpiece is formed in one piece.

13. The flute head joint according to claim 10, wherein the mouthpiece further comprises a curved windway.

14. The flute head joint according to claim 13, wherein a first edge, located at a rear end of the windway in an injection direction and facing an outer side of the mouthpiece, is offset in a direction of an injection opening with respect to a second edge located at the rear end of the windway in the injection direction and facing the chamber and/or the second edge, located at the rear end of the windway in the injection direction and facing the chamber, is beveled.

15. The flute head joint according to claim 10, wherein the mouthpiece has a stop against which the neck abuts, and wherein the stop has a streamlined edge facing the chamber of the mouthpiece and/or the stop is recessed in a region located behind the labium in an injection direction.

* * * * *